May 29, 1956
W. GERHARDT ET AL
2,747,890
VEHICLE COUPLING FOR PRODUCING ADDITIONAL
GROUND PRESSURE OF THE COUPLED VEHICLES
Filed Nov. 6, 1951
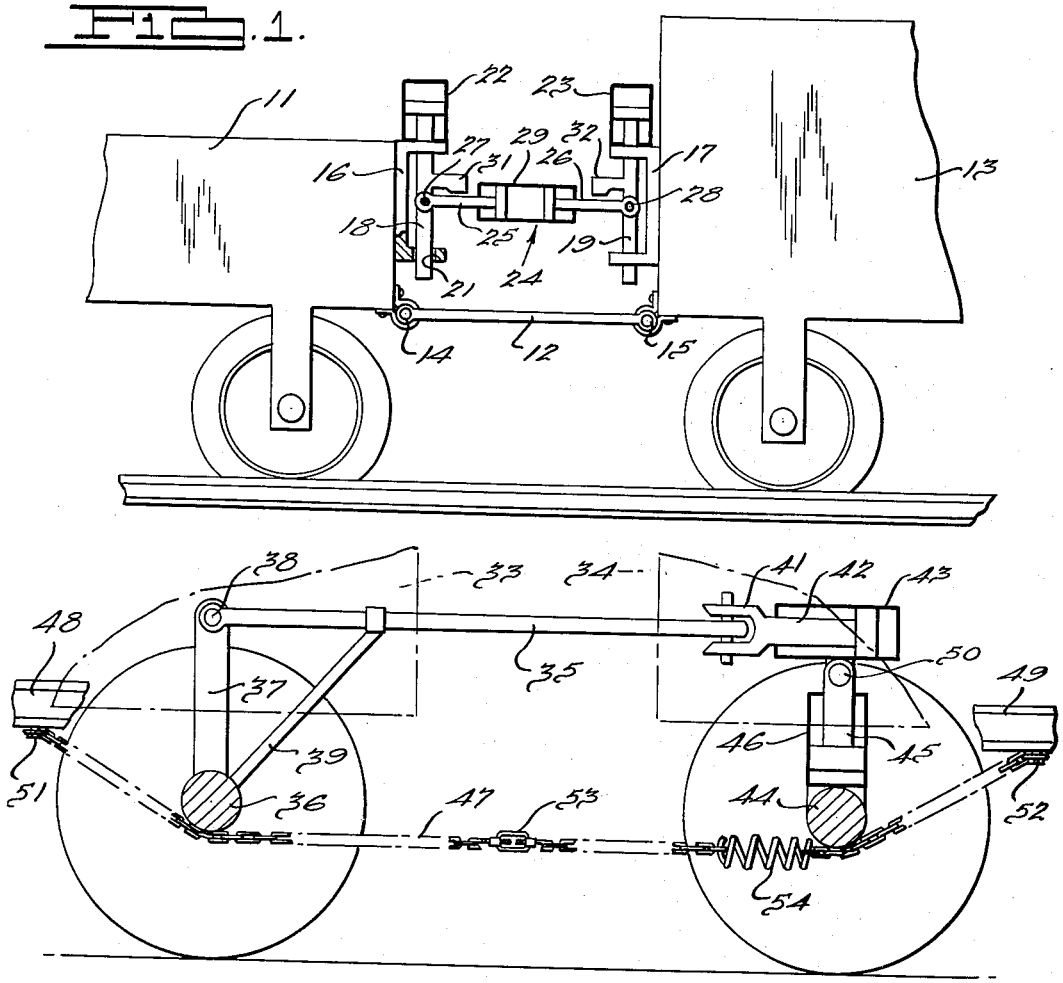
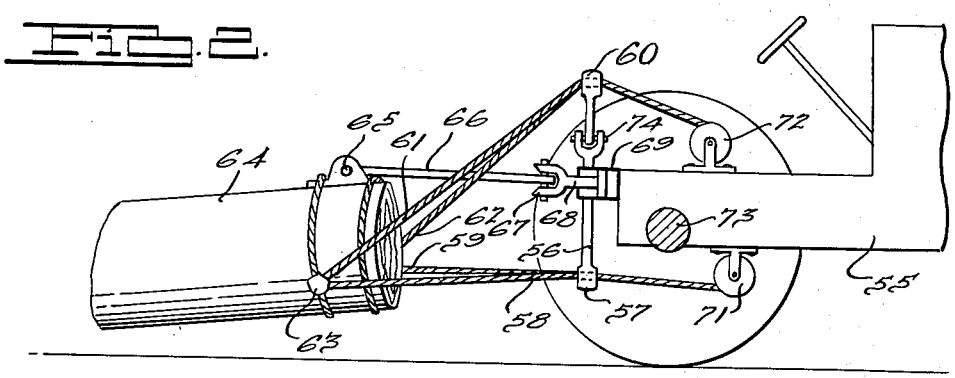
INVENTORS.
*Walter Gerhardt,
Alfred Schropp.*
BY
*Harness, Dickey & Pierce*
ATTORNEYS.

United States Patent Office 2,747,890
Patented May 29, 1956

2,747,890

VEHICLE COUPLING FOR PRODUCING ADDITIONAL GROUND PRESSURE OF THE COUPLED VEHICLES

Walter Gerhardt and Alfred Schropp, Traunstein, Germany, assignors to Hans Albert Sickinger, Providence, R. I.

Application November 6, 1951, Serial No. 255,094

Claims priority, application Germany November 16, 1950

4 Claims. (Cl. 280—406)

This invention relates to towing vehicles, and more particularly to devices and methods for increasing the efficiency of towing arrangements by proper distribution of the ground or traction pressures of the vehicles.

One of the problems encountered in arranging coupled bodies such as a tractor and towed load is that of increasing the traction forces on the towing body and maintaining a proper distribution of these forces between the front and rear axles. Although arrangements are known for increasing the rear axle load of towing vehicles by superimposing a portion of the trailer weight on the rear axle, these arrangements present the danger of increasing the tilting-up moment on the tractor front wheels due to the simultaneous shift of the tractor dead weight from the front to the rear axle. This danger is increased when the counterpull of the towed load is present, particularly when accelerating in a forward direction, and it is therefore necessary that the towing vehicle have sufficient initial weight at its front end to counteract these forces. Furthermore, the previous arrangements for obtaining this added rear axle pressure require complicated devices housed in specially built vehicles, and furthermore make no provision for transmitting kinetic or any other kind of energy, or producing any auxiliary pressure in the towing or towed bodies.

Recently the further suggestion has been made of transmitting the kinetic and potential energies of the towed load to the towing vehicle's front axle by means of tension spring and articulated lever arrangements which convert horizontal tensile forces into vertical pressure forces. These suggested arrangements are also deficient in that they cannot be properly utilized without the addition of further mechanical contrivances such as semi-rigid mechanisms going far beyond the original suggestion.

It is an object of the present invention to overcome the disadvantages of the previously known arrangements and to provide improved methods and constructions for shifting the vertical loads in coupled bodies and to transmit such loads between towing and towed bodies or between any other such coupled vehicles.

It is another object to provide an improved method and construction for producing on two bodies which are coupled together, additional pressures which are transmitted to either the front or the rear body and which may be shifted as desired on each of these bodies, for example only on the front end of a particular body, or only on its rear end, or only on the left or right side of the body, or on both simultaneously, these shifts being accomplished uniformly or non-uniformly as required.

It is also an object to provide a method and construction for counteracting the natural dead-weight shift which occurs for example in a towed body due to travel on a sloping or banking surface, so that this natural shift is partially or completely eliminated and the predetermined weight distribution on the front and rear axles remains unchanged or is regulated. In connection with this object, the invention contemplates the provision of means for shifting a desired portion of the body weight in a direction opposite to the natural dead-weight shift, for example in traveling uphill toward the front and in traveling downhill toward the rear, this body weight shift having the same result as if portions of the towed load were actually shifted as required on the towed or towing bodies.

It is a further object to provide an improved method and construction of the above character, in which the desired magnitude and shiftability of the additional load produced through energy transmission is independent of the dead weight of the body through which the transmission is effected, so that theoretically the dead weight of such body may be zero.

It is also an object to provide a method and device of the above nature, in which the shifted weight may be as large as desired within the limits imposed by the maximum load capacity, as determined by the towed vehicle's wheeled structure. In this manner the pulling capacity of the towing vehicle may be brought up to the maximum power of its engine, independent of the weight of the vehicle.

It is a further object to provide an improved arrangement of the above nature, in which the auxiliary pressure produced may be transmitted through a plurality of coupled bodies such as railroad cars. For example, the pressure shifts may serve to equalize the total weight differences of the separate coupled bodies, or to transmit to the towing vehicle weights taken from and added to a number of such bodies.

It is another object to provide a method of the above nature which may be realized in a number of different structural arrangements operable either manually or automatically, and which may be installed integrally with the coupled bodies or constructed as detachable auxiliary parts requiring little or no modification of the existing structure. Moreover, such devices may be combined with existing actuating means such as those used in the coupling, braking, or other apparatus units.

Other objects, features, and advantages of the present invention will become apparent from the subsequent description, taken in conjunction with the accompanying drawings.

In the drawings:

Figure 1 is a schematic view in elevation showing the invention as applied to a pair of coupled railroad cars, parts being cross-sectioned for clarity;

Figure 2 is a schematic view in elevation of another embodiment of the invention adapted for use with a pair of coupled ground vehicles; and Figure 3 is a third modification of the invention shown schematically in elevation and adapted for use with a farm tractor for towing such loads as a tree trunk.

The operating principles of the invention may be stated generally to consist in the transmission between two coupled bodies of potential, kinetic or other energies, or horizontally or vertically acting forces, this transmission being effected by pushing forces in an upward, downward, longitudinal or sideways direction between the coupled ends of these bodies. The transmission of potential energy or vertically acting forces is effected by shifting the burden on one end of one body to the adjacent end of the other body, this shift of burden being accomplished through lifting one body from the other body, or by forcing one body upward relative to the other body. The shifting of weights through horizontally acting forces may be effected for example by providing a coupling system consisting of a coupling of constant length and an extensible and retractable coupling vertically spaced from this coupling which forces the coupled bodies together or apart. The transmission of kinetic energy or the like, such as a horizontal counterpull or thrust between coupled bodies, is effected either through changing the direction of this force into a vertically acting force, or by converting the kinetic energy into potential energy. The conversion of such kinetic energy into vertically acting forces results in an increase of the total pressure or weight, this increase taking place on the end of the body to which the transmission is effected.

The invention may therefore be considered as having at least three separate actions which, however, may be combined to produce a unitary result. One of these actions, the pushing or pulling of the extensible and retractable coupling, serves to shift the vertical forces in each body from one end to the other of such body. Another action, that of lifting one body from the other body, results in the transmission of a vertical force between the two adjacent ends of the coupled bodies. A third action, the conversion of kinetic energy or horizontal forces into vertically acting forces, results in an increase of the total pressure or weight in one or both of the coupled bodies.

Referring more particularly to the drawings, Figure 1 illustrates a railroad car 11 which is coupled by means of a conventional coupling 12 to another car 13 which may for example be a traction engine. In the illustrated embodiment the coupling 12 is shown as being of a rigid type pivoted at its ends 14 and 15 to cars 11 and 13 respectively. It will be understood however that other types of couplings could be used. Secured to the coupled end of car 11 is a frame 16 which may for example be a channel shaped support, and secured to the adjacent end of the car 13 is a similar frame 17. These frames serve as supports for adjustable rods 18 and 19 respectively, these rods being vertically slidable in the flange portions of the frames, the flange portions being provided with apertures 21 for this purpose. Rods 18 and 19 are capable of independent movement and may be actuated by any desired means, for example hydraulic motors 22 and 23 secured above frames 16 and 17 respectively. Rods 18 and 19 are connected by an extensible and retractable coupling generally indicated at 24. This coupling comprises in the illustrated embodiment a pair of piston rods 25 and 26 pivoted at 27 and 28 to rods 18 and 19 respectively. These piston rods carry pistons in opposed relation within a double acting hydraulic motor 29 so that the piston rods may be drawn together or spread apart by conventional means. The rods 18 and 19 carry protruding noses or lateral extensions 31 and 32 which are disposed above the piston rods 25 and 26 respectively. The arrangement is such that, for instance, if rod 19 is held stationary and rod 18 is forced downwardly from its position in Figure 1, extension 31 will engage piston rod 25, tending to force the end 28 of the coupling downwardly.

In operation, it will be seen when piston rods 25 and 26 are forced apart, the coupling 12 will become tensioned and the cars 11 and 13 will have their outer ends (not shown) forced downwardly while their coupled ends tend to be pushed upwardly by the moment forces. If on the other hand the coupling 24 is retracted, the moment forces will tend to lift the outer ends of cars 11 and 13 and force added vertical loads on the coupled ends. It will be observed that in both cases, dead load shifts are effected in cars 11 and 13, the direction of these shifts depending on the directions of the moment forces. It will also be noticed that if desired the extensible and retractable coupling 24 could be disposed below the fixed coupling 12, in which case the operation would be opposite to that described.

In order to transfer weight from car 11 to car 13, the adjustable rod 18 is lowered, and if desired rod 19 is simultaneously raised. Upon this movement extension 31 of rod 18 will engage the upper surface of piston rod 25, tending to force the end 28 of coupling 24 downwardly. At the same time the car 11 will tend to be lifted by forces acting through hydraulic motor 22, and the result will be a transference of weight from car 11 to car 13. Of course a transfer in the opposite direction may be accomplished by lowering rod 19 and lifting rod 18.

It will be observed that the two operations described, namely the dead-weight shifts in either car and the weight transfers between cars, may be effected independently or simultaneously and in any desired ratio of magnitude. It is therefore possible by simultaneous operation to obtain any desired distribution of the body weights among the vehicles' axles.

Figure 2 illustrates the application of the invention to a pair of road vehicles 33 and 34 which may for example be a towed vehicle and a towing vehicle respectively. The vehicles are coupled by a center pole or rod 35 which extends substantially horizontally between the vehicles, the coupling rod being laterally movable if desired. Pole 35 is secured to the front axle 36 of vehicle 33 by means of a fixed upright 37 having pole 35 connected thereto at 38 by an articulated connection. The pole 35 is preferably held against upward or counterclockwise movement about connection 38 by a brace 39 which may comprise a chain or rod. The connection of coupling pole 35 to the towing vehicle 34 is by means of a clevis 41 on the end of a piston rod 42 actuatable by such means as a hydraulic motor 43 in a horizontal direction. The motor 43 may be immovably secured to the rear axle 44 of the towing vehicle, or, as shown in the illustrated embodiment, may be secured thereto by an articulated connection 50. This connection in turn is movably mounted on a plunger 45 operated vertically by a hydraulic motor 46 secured to axle 44.

The vehicles 33 and 34 are also joined by a tension member 47 such as a chain or cable secured to the frame 48 of vehicle 33 and the frame 49 of vehicle 34. The securing point 51 on frame 48 is preferably disposed above and rearwardly of front axle 36, and the securing point 52 to frame 49 is disposed above and forwardly of axle 44. The tension member 47 is adapted to force axles 36 and 44 upwardly and frames 48 and 49 downwardly when tensioned, and for this purpose may be disposed beneath these axles as shown in Figure 2, the ends of the tension member being inclined upwardly toward the fastening points on either side of the axles. Manual or power driven means are provided for adjusting the amount of tension in chain 47, this means taking for example the form of a turnbuckle 53. Resilient means such as a coil spring 54 is also disposed on the tension element to maintain the tension created by the adjustment of the turnbuckle.

In the operation of the mechanism shown in Figure 2, tensioning of chain 47 may be accomplished either by direct stretching through turnbuckle 53 or by extension of plunger 42, and this tensioning will serve to force axles 36 and 44 toward one another and upwardly. This forcing upward when applied by itself will produce dead-load shifts, from axle 36 on one hand and from axle 44 on the other hand, to the associated outer ends (not shown) of vehicles 33 and 34 respectively. If, independently or simultaneously with this, plunger 45 is forced upwardly, then axle 36 will tend to be lifted through coupling rod 35 and brace 39, and weight from axle 36 will thereby be transferred to axle 44. It will be understood that by simultaneous operation of plunger 45 and tensioning element 47 this transferred weight may be thus shifted as desired on vehicle 34.

Figure 3 illustrates another embodiment of the invention showing its application to a vehicle such as a farm tractor 55. Secured to the frame of the tractor is a farm implement bar 56, the lower end 57 of which holds a pair of towing cables 58 and 59 which may be a single strand or a double strand cable but is illustrated as a double strand. From the upper end 60 of the farm implement bar, which may for example be disposed under the tractor seat, lifting cables 61 and 62 extend downwardly and rearwardly to the load. The towing cables and lifting cables may be secured to one or more hook-on points 63 on a trailer, implement or as illustrated, a tree trunk 64. On the tree trunk is mounted an articulated joint 65 to which is connected a center pole or rod coupling 66. This coupling extends forwardly to the tractor and is secured thereto by means of a clevis 67. The clevis may be forced rearwardly by means of a plunger 68 operated by a hydraulic motor 69 and takes the place of the conventional towing hook. From the points 57 and 59 the towing and lifting cables may be run to tensioning devices operated by manual or power means, such as drums 71 and 72 secured to the tractor frame.

In operation of the mechanism of Figure 3, by tightening the towing cables 58 and 59 the center pole 66 is forced forwardly but is held by hydraulic motor 69 against movement. Through this action the rear axle 73 of the tractor and the front part of the towed load are forced toward one another and upwardly. By tightening the lifting cables 61 and 62 the towed load is raised, and through this action kinetic energy is converted into potential or other energy and loaded over onto the tractor rear axle. The ratio of towing and lifting cable tensions produces in tractor 55 the desired shiftability of the total ground pressure which exists by virtue of the tractor's own weight. Moreover, this total ground pressure may be increased as desired through transfer of weight from the towed load.

Means are preferably provided in the embodiment of Figure 3 for shifting the additional ground pressure to the left or right sides of the towing vehicle 55. This means may comprise for example a pivoted connection 74 for the upper end 59 of the implement bar, allowing this upper end to swing to either side of the tractor.

It will thus be observed that the invention is capable of application to two or more coupled bodies and will operate efficiently to shift the ground pressure weight within these bodies as well as transferring these weights between adjacent bodies. The pulling capacity of each towing vehicle may therefore be made utilizable up to the maximum power of its engine and independently of its own weight. If the total weight of a road tractor for example is increased through shifting and transferring loads by fifty percent of its own weight, then its tractive power (delivered through its pressure against the ground) is simultaneously increased by 66.66%. The absolute 16.66% gain of efficiency results from the fact that the shifted weight is no longer towed but is transported upon the towing vehicle and correspondingly increases the running power and tractive power of this vehicle, provided and to the extent that the available engine power is sufficient for motion.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a device for transferring weight between a pair of vehicles each having longitudinally spaced ground engaging elements and simultaneously shifting the ground pressures between said elements, a pair of vertically spaced coupling members connecting said vehicles, one of said coupling members being of relatively fixed length, means for extending and retracting the other of said coupling members for respectively pushing said vehicles apart and pulling them toward each other, means on one of said vehicles for holding one end of one of said coupling members against vertical movement in one direction, a force-transmitting member on the other of said vehicles movable in a vertical direction, and means connecting said one coupling member with said force-transmitting member, whereby said one coupling member may be forced in said vertical direction by said force-transmitting member.

2. In a device for adjusting ground pressures in and between two coupled vehicles, a coupling member of relatively fixed length between said vehicles, a vertically slidable force-transmitting member on each of said vehicles, an extensible and retractable coupling member connecting said vertically slidable members, means for changing the length of said last mentioned coupling member, an extension on one of said vertically slidable members engageable with said extensible and retractable coupling member, and actuating means for moving said vertically slidable member in a direction to force said extension against said extensible and retractable coupling member.

3. In a device for adjusting weights and ground pressures between a towing and a towed vehicle, a coupling member connecting said vehicles, extensible and retractable actuating means at the towing end of said coupling member, means for lifting said towing end of said coupling member, and securing means between the towed end of said coupling member and the towed vehicle to resist said lifting movement.

4. A device for transferring weight between a pair of vehicles each having longitudinally spaced ground engaging elements and shifting the weight of said vehicles away from the adjacent ground engaging elements of said vehicles, a coupling member interconnecting adjacent ends of said vehicles and being of relatively fixed length, means vertically spaced from said coupling member also interconnecting said vehicles and including means for changing the effective length of a part of said means and thereby shifting the weight of said vehicles away from the adjacent ground engaging elements thereof and means supported on one of said vehicles for applying a lifting force to the other of said vehicles and thereby transferring weight from said other of said vehicles to said one of said vehicles, said means for changing the effective length of said means interconnecting said vehicles and said means for applying a lifting force being operable and adjustable independently of each other.

References Cited in the file of this patent

UNITED STATES PATENTS

| 1,481,376 | Klein | Jan. 22, 1924 |
| 2,459,098 | Simmons | Jan. 11, 1949 |

FOREIGN PATENTS

| 577,203 | France | May 31, 1924 |
| 677,061 | France | Dec. 7, 1929 |
| 541,887 | Germany | Jan. 18, 1933 |